United States Patent Office.

JERRY LEWIS, OF ALBION, NEW YORK.

Letters Patent No. 76,641, dated April 14, 1868.

IMPROVED STOVE-POLISH OR BLACKING.

The Schedule referred to in these Letters Patent and making part of the same.

TO ALL WHOM IT MAY CONCERN:

Be it known that I, JERRY LEWIS, of Albion, in the county of Orleans, in the State of New York, have invented a new and improved Mixture for Blacking Stoves; and I do hereby declare that the following is a full, clear, and exact description of the same.

Take thirty-two pounds of gelatinous solution, made by dissolving two pounds of gelatine, or its equivalent in gelatinous matter, in thirty pounds of water; to this add one and one-half pound of nitric acid, twenty pounds of either black lead, silver lead, or carbonate of iron, twelve gallons of water, five gallons of ale, also two or more quarts of molasses, or its equivalent in other saccharine matter.

This mixture is applied to the stove in any convenient way, and allowed to dry, after which it is polished.

What I claim as new, and desire to secure by Letters Patent, is—

A mixture, of the ingredients above mentioned, in about the proportions specified, for the purpose set forth.

The above specification of my invention signed by me, this 27th day of January, 1868.

J. LEWIS.

Witnesses:
   H. A. WASHBURN,
   GEO. M. HOPKINS.